US006257543B1

(12) United States Patent
Huelsmann

(10) Patent No.: US 6,257,543 B1
(45) Date of Patent: Jul. 10, 2001

(54) VIBRATOR BRACKET

(76) Inventor: Arnold W. Huelsmann, 104 N. Walnut St., Trenton, IL (US) 62293

( * ) Notice: Subject to any disclaimer, the term of this patent is extended or adjusted under 35 U.S.C. 154(b) by 0 days.

(21) Appl. No.: 09/218,349

(22) Filed: Dec. 22, 1998

Related U.S. Application Data

(63) Continuation-in-part of application No. 08/886,964, filed on Jul. 2, 1997, now abandoned.

(51) Int. Cl.$^{7}$ .......... F16M 1/00

(52) U.S. Cl. .......... 248/674; 638/646; 638/671

(58) Field of Search .......... 248/634, 635, 248/638, 678, 674, 679, 645, 224.51, 223.41, 222.51, 220.21, 200, 671, 646, 647; 294/81.6; 376/284; 221/200

(56) References Cited

U.S. PATENT DOCUMENTS 3,637,171 * 1/1972 Kroeger .......... 248/14
4,039,128 * 8/1977 Hicks, Jr. .......... 248/14
4,220,311 * 9/1980 Wolff .......... 248/645
4,238,104 * 12/1980 Hamilton .......... 248/566
5,017,328 * 5/1991 Mazurek .......... 248/560 X
5,167,396 * 12/1992 Burba et al. .......... 248/638 X
5,417,401 * 5/1995 Thompson et al. .......... 248/674
5,464,187 * 11/1995 Linkner, Jr. .......... 248/635
5,489,133 * 2/1996 Powers et al. .......... 294/81.6
5,609,437 * 3/1997 Silva .......... 404/118
5,636,826 * 6/1997 Nakagaki et al. .......... 248/562
5,718,407 * 2/1998 Lee .......... 248/634
5,833,205 11/1998 Lindbeck .......... 248/674

* cited by examiner

*Primary Examiner*—Leslie A. Braun
*Assistant Examiner*—Tan Le
(74) *Attorney, Agent, or Firm*—Armstrong Teasdale LLP

(57) ABSTRACT

A vibrator bracket for securing a vibrator to an object to be vibrated. The vibrator includes a first platform adapted for receiving a vibrator, and a second platform for attaching the vibrator bracket to a standard receptacle located on the object to be vibrated. The second platform extends from the first platform, and includes a top portion which decreases in thickness along the distance from a front end to a rear end of second platform. A handle extends and curves in a concave shape in relationship to first platform to allow easy insertion and removal of vibrator bracket from receptacle.

15 Claims, 4 Drawing Sheets

VIBRATOR BRACKET

RELATED APPLICATION

This invention is a continuation in part, of patent application Ser. No. 08/886,964, filed on Jul. 2, 1997, now abandoned in the name of Arnold W. Huelsmann for VIBRATOR BRACKET.

BACKGROUND OF THE INVENTION

This invention relates generally to vibrators and, more particularly, to a vibrator bracket for settling concrete and unloading materials.

Vibrators are typically utilized to aid in the formation of large concrete structures and in removal of bulk materials from storage containers. Typically, large concrete structures require a large formation vessel in which the concrete is cured. Air pockets may be formed by air trapped in the concrete when it is poured into the formation vessel. Curing the concrete without removal of the air pockets produces an ultimately weak concrete structure. Vibrators are utilized to repeatedly shake the formation vessel and remove any air trapped in the concrete after it is poured.

Vibrators are also utilized to aid in the removal of bulk materials from storage containers also utilized for transportation, such as railroad cars and drum units, during unloading. These vibrators are commonly attached to the wall of an object to be vibrated by bolts, brackets and other fastening devices. Several bolts are required to maintain sufficient contact between the vibrator and the object to be vibrated.

In particular, the vibrators must be tightly secured to the object to be vibrated for proper vibration performance. However, using several bolts and brackets to secure the vibrators is disadvantageous in that it prevents quick and easy removal of the vibrators by workers.

Setting up these vibrator and bracket assemblies for use is also time consuming. After one object has been vibrated, the vibrator and bracket assembly must be unbolted, moved to the next object to be vibrated, and rebolted into place. This process of unbolting and rebolting to release and secure the vibrator to the bracket and the bracket to the object to be vibrated is tedious and time consuming.

For example, a small concrete plant may repeat the process twenty times to complete ten concrete structures. The brackets often do not have handles for positioning the bracket in and removing the bracket from the object to be vibrated, which makes the mounting of the vibrator assemblies even more time consuming and difficult.

Moreover, many of these brackets require special customized parts, including pins of special diameter and length, and customized eye bolts to fasten the vibrators into place on the brackets. Typically, these customized parts are costly and not always readily available. Furthermore, the extreme vibration of these vibrators often causes the customized parts to wear out, thus requiring regular replacement.

Accordingly, it would be desirable to provide a vibrator bracket that easily transports and secures a vibrator into place, and does not require bolts to attach, tighten, and secure the bracket onto the object to be vibrated. In addition, it would be desirable to provide a vibrator bracket that may be used with several types of vibrators yet is inexpensive to manufacture.

BRIEF SUMMARY OF THE INVENTION

These and other objects may be attained by a vibrator bracket which is shaped to quickly and easily secure to a vibrator and then quickly and easily move and attach to an object to be vibrated.

Generally, the vibrator bracket includes a first platform, a second platform, and a handle. The first platform has a surface adapted for receiving or securing a vibrator. The second platform is adapted for attaching the bracket to the object to be vibrated. The vibrator bracket is unitary with the second platform and the handle extending from the first platform. The handle allows the vibrator bracket and attached vibrator to be quickly and easily moved from one object to be vibrated to another object to be vibrated.

The vibrator bracket of the present invention allows the vibrator to be secured to the object to be vibrated without requiring customized fastening elements. The vibrator bracket is easily transported by the vibrator bracket handle. In addition, the vibrator bracket slidingly engages a sleeve or a receptacle on the object to be vibrated without requiring customized parts or fastening elements.

DETAILED DESCRIPTION OF THE INVENTION

Figure 1:
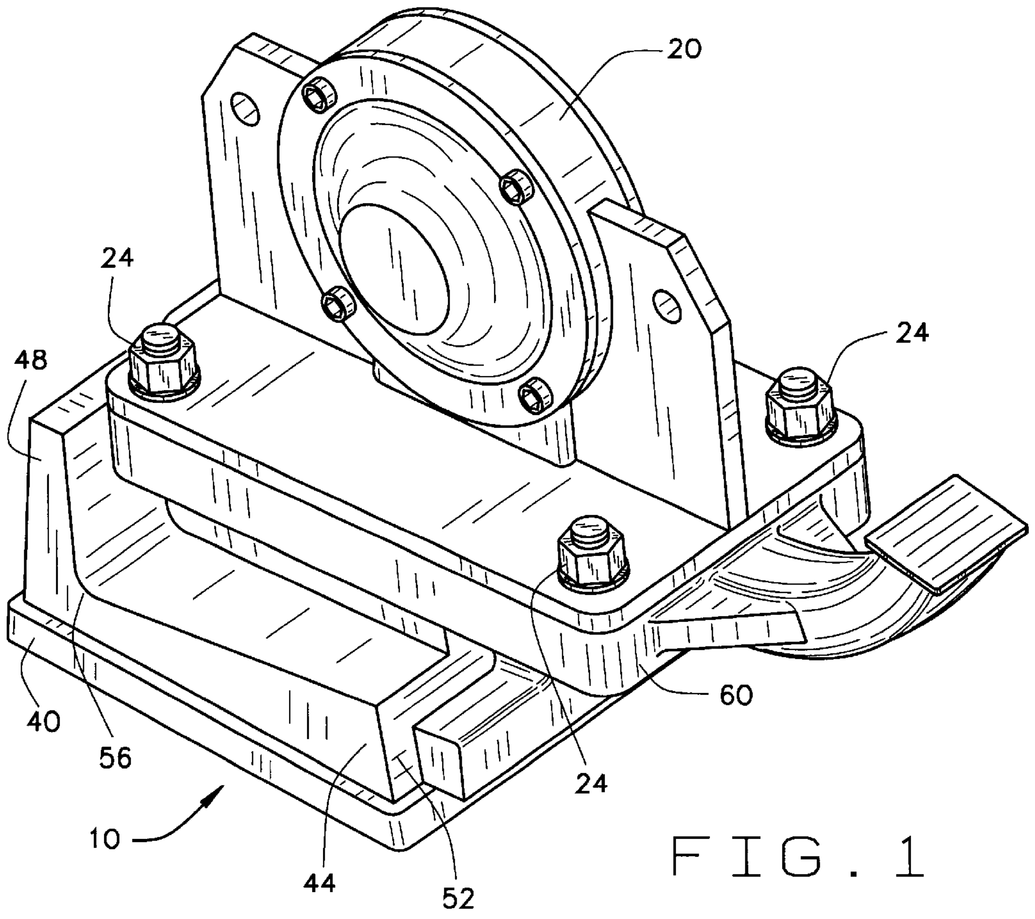
FIG. 1 is a perspective view of a vibrator assembly in accordance with an embodiment of the present invention and including a vibrator bracket inserted into a receptacle and shown with an attached vibrator.

FIG. 1 is an illustration of a vibrator assembly 10 in accordance with an embodiment of the present invention. Assembly 10 includes a commercially available vibrator 20 movably coupled to a known receptacle 40 by a vibrator bracket 60. Vibrator 20 may be pneumatic, electric or hydraulic, and is secured to vibrator bracket 60 by fastening elements 24. Vibrator bracket 60 is movably coupled to a standard receptacle 40. Receptacle 40 is unitary with a first portion 44 and a second portion 48. First portion 44 is wedge shaped with a first end 52 having a height greater than the height of a second end 56.

Second portion 48 is perpendicular to first portion 44 and is shown in FIG. 1 in a vertical position, however in other embodiments, may be positioned in any manner including a horizontal position. Typically, receptacle 40 is fixedly attached to an object to be vibrated.

Figure 2:
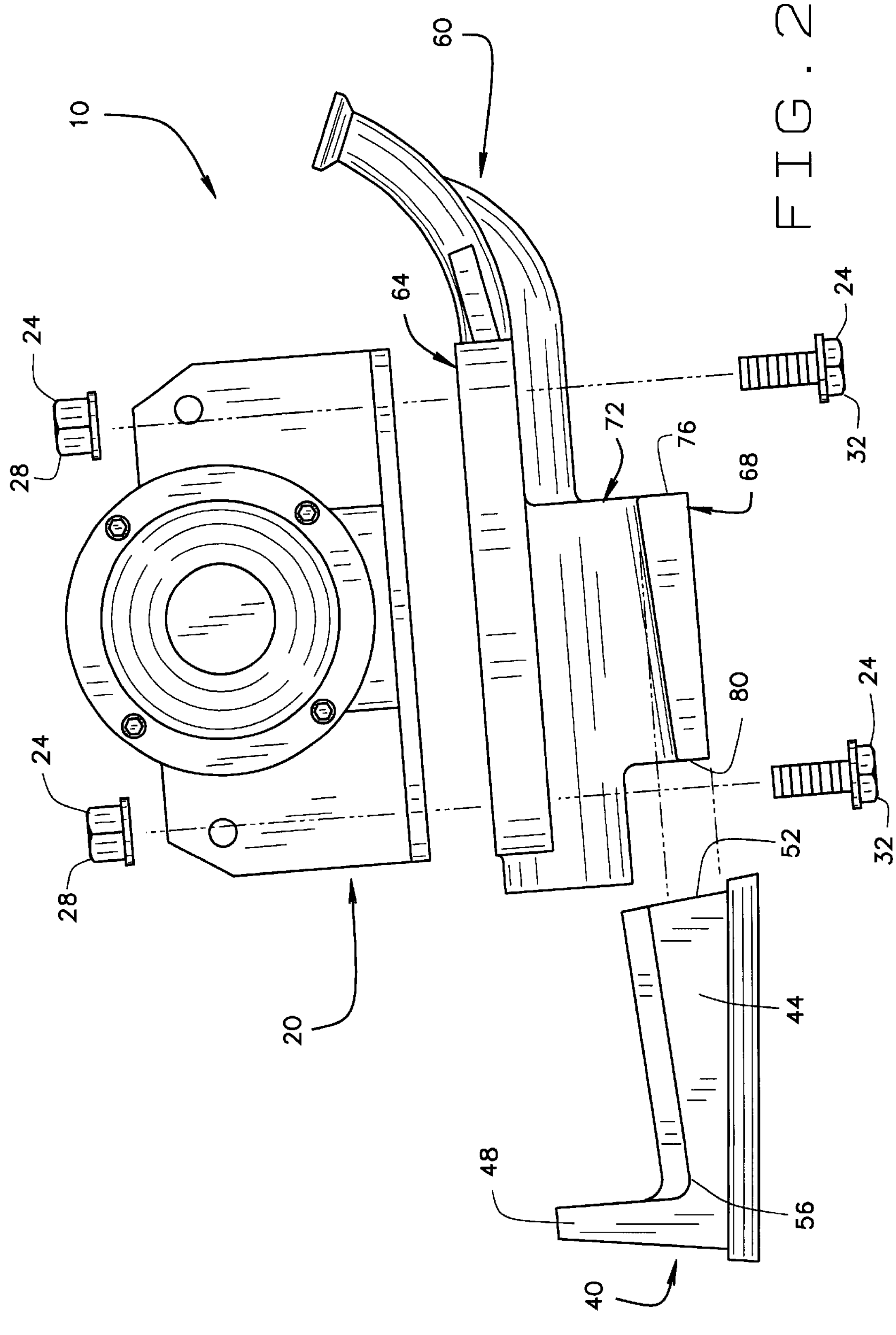
FIG. 2 is an exploded view of the vibrator assembly shown in FIG. 1.

FIG. 2 illustrates an exploded view of vibrator assembly 10 shown in FIG. 1. Fastening elements 24 include nuts 28 and bolts 32 that secure vibrator 20 to vibrator bracket 60.

Vibrator bracket 60 includes a first platform 64 adapted for receiving vibrator 20, and a second platform 68 extending from first platform 64 and separated by a middle section 72. In one embodiment vibrator bracket 60 is unitary, with second platform 68 configured so that assembly 10 may be secured to the object to be vibrated (not shown). More specifically, second platform 68 is wedge shaped with a first end 76 having a height greater than the height of a second end 80. Second platform 68 is movably coupled to receptacle 40.

Figure 3:
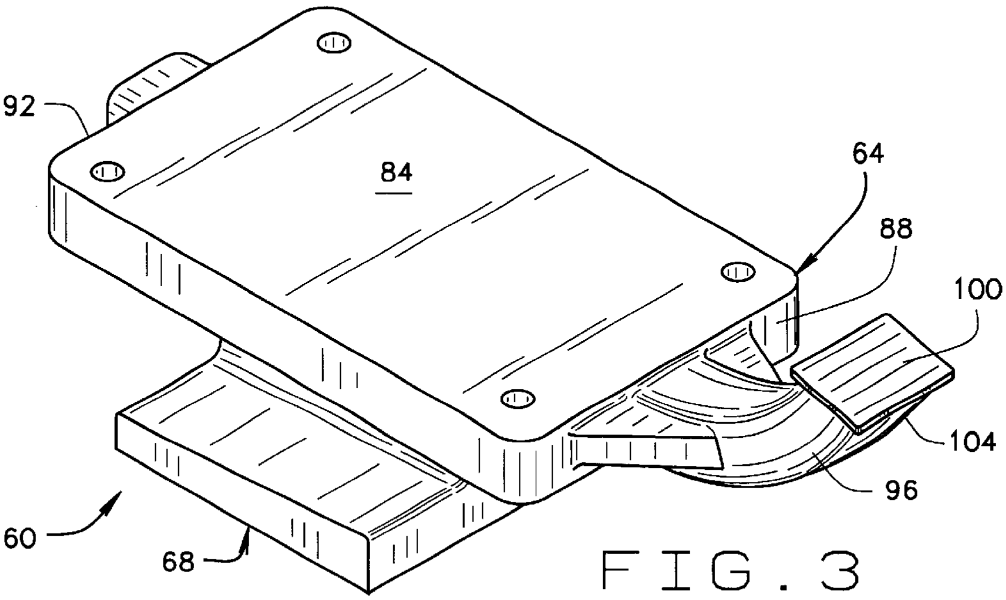
FIG. 3 is a perspective view of the vibrator bracket shown in FIG. 1.

FIG. 3 is a perspective illustration of vibrator bracket 60. In one embodiment, first platform 64 has a first surface 84 that is substantially flat and adjacent to vibrator 20 (shown in FIGS. 1 and 2). First platform 64 has a first end 88 and a second end 92.

A first handle 96 extends from first end 88 of first platform 64. First handle 96 has a plate 100 attached at an end 104. In one embodiment, first handle 96 is configured in a concave shape in respect to first platform 64 and second platform 68. Plate 100 provides a larger area to grab onto handle 96 for removal of vibrator bracket 60 from receptacle 40 (shown in FIGS. 1 and 2) which is attached to an object to be vibrated. Vibrator bracket 60 may then be transported and inserted into another receptacle 40 attached to another object to be vibrated.

Figure 4:
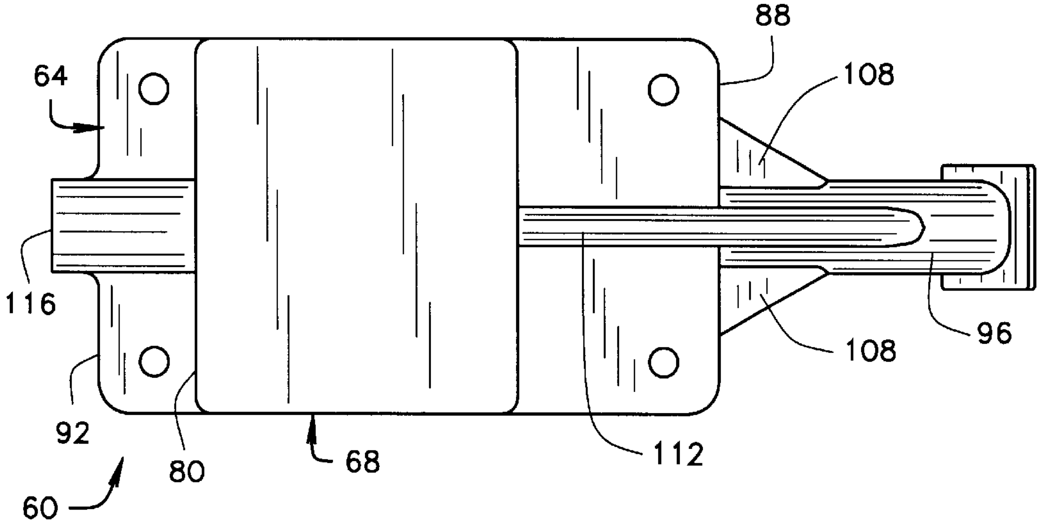
FIG. 4 is a bottom plan view of the vibrator bracket shown in FIG. 1.

FIG. 4 illustrates a bottom plan view of vibrator bracket 60. In one embodiment, at least one flange 108 and a supporting member 112 extend from vibrator bracket 60 to handle 96 to reinforce handle 96.

In alternative embodiments, first handle 96 may be of various sizes and shapes. For example, vibrator bracket 60 may include a straight handle, a handle of different length, a handle that is cupped, a plurality of additional handles may extend from handle 96, or a plurality of handles may extend from a handle that is cup shaped, as described below in greater detail. A butt 116 extends from middle section 72 (shown in FIG. 2) and past second end 92 of first platform 64 and second end 80 of second platform 68.

Figure 5:
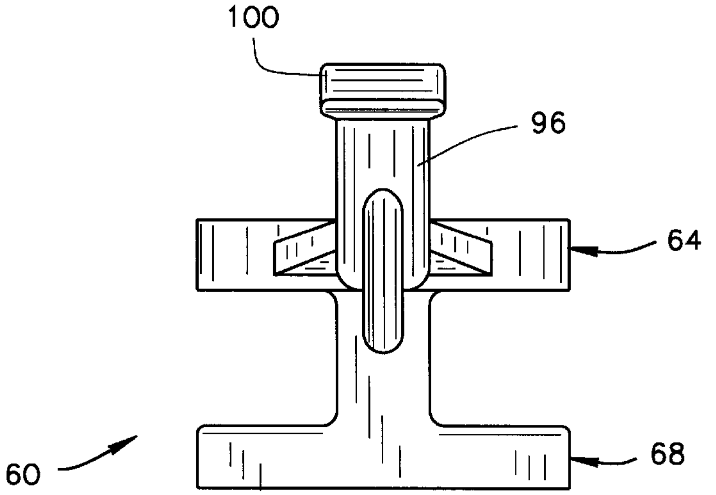
FIG. 5 is a front view of the vibrator bracket shown in FIG. 1.

FIG. 5 illustrates a front view and is included to provide a further illustration of vibrator bracket 60.

In operation, receptacle 40 is fixedly attached to an object to be vibrated, typically a railroad car, a concrete formation vessel, or some other kind of vessel which contains material that either must be removed from or settled into the vessel. Vibrator 20 is secured to first platform 64 and the vibrator bracket 60 is transported by handle 96 and platform 100 to the object to be vibrated.

Second platform 68 of vibrator bracket 60 is then inserted into first portion 44 of receptacle 40 and vibrator 20 is started. Once the vibrating of the vessel is complete, vibrator 20 is stopped and vibrator bracket 60 with secured vibrator 20 may be quickly removed from the first object to be vibrated and secured to a second object to be vibrated. Vibrator bracket 60 provides for quick and easy transporting and securing of vibrator 20 onto receptacle 40 that is fixedly attached to the objects to be vibrated. Vibrator bracket 60 may be made from a light and durable metal such as aluminum, titanium, or a steel alloy that can withstand the forces generated by vibrator 20.

Figure 6:
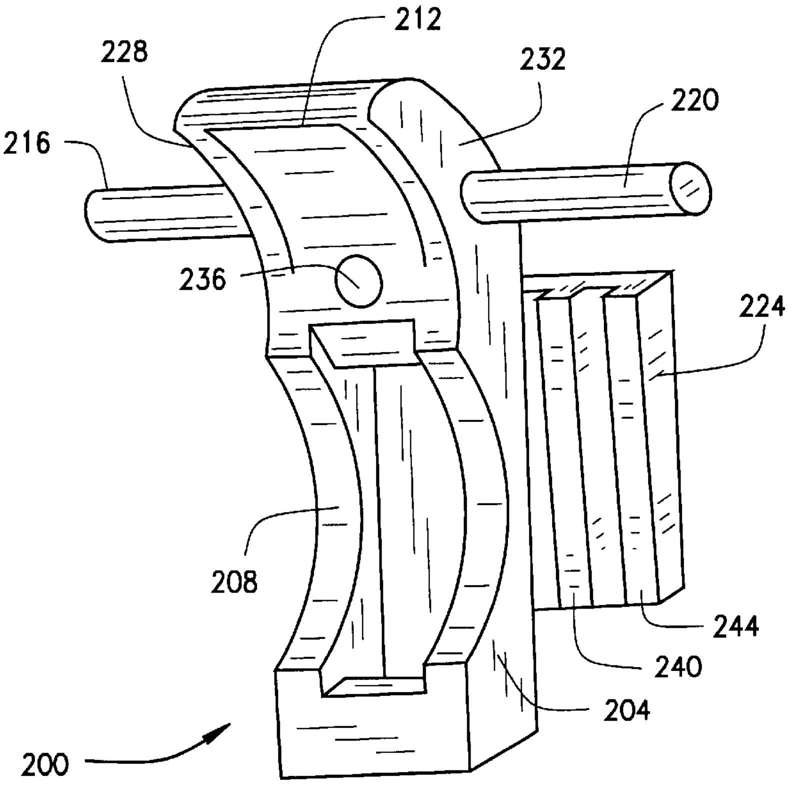
FIG. 6 is a perspective view of a vibrator bracket in accordance with another embodiment of the invention.
Figure 7:
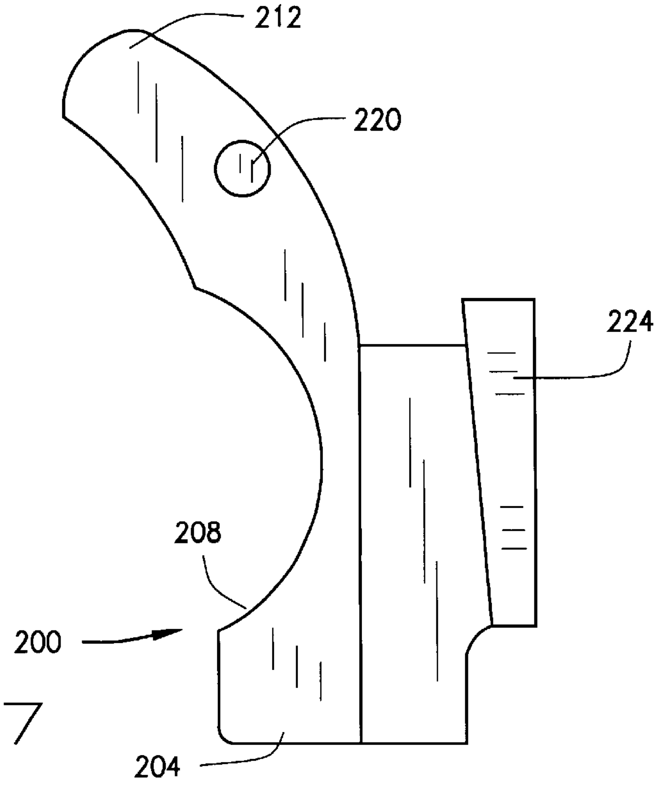
FIG. 7 is a side view of the vibrator bracket shown in FIG. 6.

FIGS. 6 and 7 illustrate a vibrator bracket 200 in accordance with an another embodiment of the present invention. Vibrator bracket 200 includes a first platform 204 having a first surface 208 that is concave in shape and arced inwardly to cradle commercial vibrator 20 (shown in FIGS. 1 and 2).

Vibrator bracket 200 includes a first handle 212, a second handle 216, and a third handle 220. Vibrator bracket 200 includes a second platform 224 that is inserted and removed from standard receptacle 40 (shown in FIGS. 1 and 2) that is fixedly attached to an object to be vibrated. Second platform 224 is similar to second platform 68 in FIGS. 2, 3, 4, and 5.

Second handle 216 and third handle 220 extend outwardly from a first side 228 and a second side 232, respectively of first handle 212. First handle 212 is cup shaped and located above an aperture 236 which extends through first handle 212 for receiving a fastening element, such as a rebar screw (not shown), for securing the vibrator to the object to be vibrated. In the present embodiment, the rebar screw is inserted into aperture 236 and repeatedly tightened until vibrator 200 is secured to the object to be vibrated.

Second platform 224 includes grooves 240 formed on top surface 244 of second platform 224. Groves 240 slidingly engage the inner walls of receptacle 40. Grooves 240 help position and facilitate removal of vibrator bracket 200 from receptacle 40. In the present embodiment, vibrator bracket 200 may be made from a light and durable metal such as aluminum, titanium, or a steel alloy that can withstand the forces generated by vibrator 20.

In operation, vibrator bracket 200 is similar to vibrator bracket 60 except that once vibration of an object to be vibrated is complete, vibrator bracket 200 may be removed by handles 212, 216, 220, or combinations thereof and transported to another object to be vibrated by handles 212, 216, 220, or combinations thereof.

Vibrator brackets 60 and 200 allow vibrator 20 to be secured to the object by standard receptacle 40 that is fixedly attached to the object to be vibrated without requiring customized fastening elements.

Vibrator brackets 60 and 200 are easily transported by vibrator bracket handles 96, 212, 216, or 220, respectively. In addition, vibrator brackets 60 and 200 slidingly engage known receptacle 40, fixedly attached to the object to be vibrated without requiring customized parts or fastening elements.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A vibrator bracket for securing a vibrator to a receptacle secured onto an object to be vibrated, said vibrator bracket comprising:

a first platform having a first end, a second end, and a first surface configured to receive the vibrator;

a second platform extending from said first platform and configured to movably couple to the receptacle; and a first handle extending from said first end of said first platform, said first handle reinforced by at least one flange and a supporting member.

2. A vibrator bracket in accordance with claim 1 wherein said first handle further comprises a second handle and a third handle, said second handle and said third handle extending from said first handle.

3. A vibrator bracket in accordance with claim 2 wherein an aperture extends through the first handle for receiving a fastening element.

4. A vibrator bracket in accordance with claim 3 wherein a fastening element extends through said aperture for securing the vibrator bracket to the object to be vibrated.

5. A vibrator bracket in accordance with claim 4 wherein said fastening element is a replaceable rebar screw.

6. A vibrator bracket in accordance with claim 1 wherein said second platform is wedge shaped having a first end of greater height than a second end.

7. A vibrator bracket in accordance with claim 1 wherein said second platform further includes a series of grooves for securing the vibrator bracket to the object to be vibrated.

8. A vibrator bracket in accordance with claim 1 wherein said first platform comprises an arced first surface to receive the vibrator.

9. A vibrator bracket for mounting a vibrator into a receptacle on an object to be vibrated, the vibrator bracket comprising:

a first platform having a first end and a second end;

a wedge shaped second platform extending from said first platform, wherein said second platform is adapted to slidingly engage the receptacle; and a first handle extending from said first end of said first platform.

10. A vibrator bracket in accordance with claim 9 further comprising an aperture extending through said first handle and adapted for receiving a fastening element.

11. A vibrator bracket in accordance with claim 10 wherein said fastening element is a replaceable rebar screw.

12. A vibrator bracket in accordance with claim 9 wherein said first platform comprises a first surface adapted to receive the vibrator.

13. A vibrator bracket in accordance with claim 9 wherein said first handle further comprises a second handle and a third handle, said second handle and said third handle extending from said first handle.

14. A method for movably coupling a vibrator to an object, utilizing a vibrator bracket, the object having a receptacle fixedly attached, the vibrator bracket includes a first platform, a second platform, wherein the vibrator bracket further includes a first handle, a second handle, and a third handle, said method comprising the steps of:

securing the vibrator to the vibrator bracket first platform; and inserting the vibrator bracket second platform into the receptacle, said step of inserting the vibrator bracket including the steps of:

lifting the vibrator secured to the vibrator bracket first platform by the first handle, the second handle, the third handle, or combinations thereof;

carrying the vibrator bracket by the first handle, the second handle, the third handle, or combinations thereof to the object to be vibrated; and utilizing the first handle, the second handle, the third handle or combinations thereof to insert the vibrator bracket second platform into the receptacle.

15. A method in accordance with claim 14 wherein the vibrator bracket further includes an aperture extending through the first handle, said method further comprising the steps of:

inserting a fastening element through the aperture extending through the first handle; and securing the vibrator bracket to the object by repeatedly tightening the fastening element.

* * * * *